US006309617B1

(12) United States Patent
Andorf et al.

(10) Patent No.: US 6,309,617 B1
(45) Date of Patent: Oct. 30, 2001

(54) SOLID FOR STORING/RELEASING NITROGEN OXIDES AS WELL AS NITROGEN OXIDE STORAGE CATALYST

(75) Inventors: Renato Andorf, Meckenbeuren; Carsten Plog, Markdorf; Guido Schaeffner, Horgenzell, all of (DE)

(73) Assignee: Dornier GmbH, Friedrichshafen (DE)

( * ) Notice: Subject to any disclaimer, the term of this patent is extended or adjusted under 35 U.S.C. 154(b) by 0 days.

(21) Appl. No.: 09/113,546

(22) Filed: Jul. 10, 1998

(30) Foreign Application Priority Data

Jul. 10, 1997 (DE) ............................................. 197 29 517
Dec. 23, 1997 (EP) ............................................. 97 122 767

(51) Int. Cl.⁷ ............................ B01D 53/56; B01D 53/94
(52) U.S. Cl. .................................. 423/213.5; 423/239.1; 423/239.2
(58) Field of Search ........................... 423/239.1, 239.2, 423/213.5, 213.7

(56) References Cited

U.S. PATENT DOCUMENTS

| | | | | |
|---|---|---|---|---|
| 3,857,921 | * | 12/1974 | Tamura et al. ..................... | 423/213.5 |
| 4,382,879 | | 5/1983 | Funabashi et al. . | |
| 5,559,072 | * | 9/1996 | Itoh et al. ............................. | 502/347 |
| 5,589,432 | * | 12/1996 | Yoshida et al. ...................... | 502/325 |
| 5,714,432 | * | 2/1998 | Yoshida ............................. | 423/239.1 |
| 5,727,385 | * | 3/1998 | Hepburn ............................. | 423/213.7 |
| 5,772,973 | * | 6/1998 | Yoshida et al. .................... | 423/239.1 |
| 5,824,621 | * | 10/1998 | Abe ....................................... | 502/305 |
| 5,882,607 | * | 3/1999 | Miyadera ............................. | 502/330 |
| 6,103,208 | * | 8/2000 | Ogawa et al. ..................... | 423/213.2 |
| 6,171,565 | * | 1/2001 | Höhne et al. ....................... | 423/239.1 |

FOREIGN PATENT DOCUMENTS

| | | |
|---|---|---|
| 42 24 881 A1 | 2/1994 | (DE) . |
| 196 06 657 C1 | 7/1997 | (DE) . |
| 0 636 770 A1 | 2/1995 | (EP) . |
| 707882 * | 4/1996 | (EP) . |
| 0 719 580 A1 | 7/1996 | (EP) . |
| 0 778 072 A2 | 6/1997 | (EP) . |
| 132764 | 5/1975 | (JP) . |
| 5-92125 A * | 4/1993 | (JP) ................................. 423/213.2 |
| 08-182928 * | 7/1996 | (JP) . |

* cited by examiner

Primary Examiner—Steven P. Griffin
Assistant Examiner—Timothy C Vanoy
(74) Attorney, Agent, or Firm—Crowell & Moring LLP

(57) ABSTRACT

An Ag-containing solid, such as $Ag_2O$, $Ag_2CO_3$, and AgOH, is used for storing/releasing nitrogen oxides in an exhaust gas from an engine during controlled cycling of the $\lambda$-value of the exhaust gas. The nitrogen oxides are stored at $\lambda$-values of the gas greater than 1 in the Ag-containing solid and the nitrogen oxides are released at $\lambda$-values of the gas less than or equal to 1 from the Ag-containing solid. The Ag-containing solid may include a precious metal or a microporous carrier, for example, $ZrO_2$, $SiO_2$, $TiO_2$, Si—Al mixed oxide, and zeolites.

7 Claims, 7 Drawing Sheets

SOLID FOR STORING/RELEASING NITROGEN OXIDES AS WELL AS NITROGEN OXIDE STORAGE CATALYST

BACKGROUND AND SUMMARY OF THE INVENTION

This application claims the priority of German patent documents 197 29 517.7, filed Jul. 10, 1997 and 97 122 767.3, filed Dec. 23, 1997, the disclosures of which are expressly incorporated by reference herein.

The invention relates to a solid for storing/releasing nitrogen oxides (NOx) as well as to a nitrogen oxide storage catalyst.

Worldwide, numerous groups are working on the development of catalysts for removing nitrogen from lean-otto-engine exhaust gases. One development direction which is currently pursued intensively concerns the so-called NOx storage catalysts, which are to be used in the exhaust gas of lean-mix-operated otto engines. See Shin'ichi Matsumoto, *Catal. Today*, 29 (1996) 43/1/ and W. Boegner, M. Kraemer, B. Krutzsch, S. Pischinger, D. Voigtlander, G. Wenninger, F. Wirbeleit, M.S. Brogan, R. J. Brisley, et al., *Appl. Catal.*, B7 (1995) No. 1–2, Pages 153–171. In this case, the nitrogen oxides are stored during lean operation of the engine, and are released again during rich or stoichiometric operating phases and simultaneously converted on a conventional three-way catalyst to $N_2$. The NOx storage catalyst is correspondingly composed of two material components, the NOx storage component and a solid with a catalytic activity for removing nitrogen (for example, a three-way catalyst). The NOx storage material stores the nitrogen oxides as nitrates. For this purpose, alkaline and earth-alkaline compounds are used as solid constituents.

A decisive problem which currently does not permit the use of the NOx storage catalyst in series is the insufficient resistance of the NOx storage material to sulfurous constituents in the exhaust gas and to high temperatures. Another problem consists of the fact that, because of the oxidation of the NOx to $NO_2$ required for the nitrate storage, this type of catalyst can be used only above a certain temperature (approximately 200° C.). In the driving test cycle stipulated by law, the low-temperature range (in Europe: Cold start and ECE) therefore cannot be covered.

In the technical literature, Ag on a zeolitic carrier of the MFI type is described as a solid which adsorbs NOx. See, W. Zhang, H. Yahiro, N. Mizuno, J. Izumi and M. Iwamoto, *Langmuir*, 9 (1993) 2337 and W. Zhang, H. Yahiro, N. Mizuno, M. Iwamoto and J. Izumi, *J. Mater. Sci. Lett* 12 (1993) No. 15, 1197.

It is an object of the invention to provide an NOx storage material which is suitable for a use in an NOx storage catalyst, and has a sufficient resistance to sulfurous constituents in the exhaust gas.

This goal is achieved by the Ag-containing solid used according to the invention, which can be loaded (among other methods, by adsorption) or unloaded (among other methods, by desorption) with nitrogen oxides by the targeted change of the $\lambda$-value (=ratio of the gas constituents acting in an oxidizing to reducing manner) of the gas atmosphere situated above the solid. If $\lambda$-values are higher than one, the nitrogen oxides will be stored; if the values are equal to or lower than one, the nitrogen oxides are released.

In addition to Ag-containing compounds (for example, elemental Ag, $Ag_2O$, $Ag_2CO_3$ or AgOH), the solid used according to the invention, may also contain one or several precious metals (such as Pt, Pd, Rh, Ir, Au, Ru, Os). The Ag-containing and precious-metal-containing compounds can advantageously be applied to microporous carrier substances, such as $Al_2O_3$, $CeO_2$, La-containing $CeO_2$, $ZrO_2$, La-containing $ZrO_2$, $SiO_2$, $TiO_2$, Mg-Al mixed oxide, Si-Al mixed oxide, zeolites or a mixture of several of the above-mentioned compounds. In this case, the BET-surface of the carrier substance is between 10 and 1,000 $m^2/g$, in particular.

The Ag-containing solid according to the invention, in particular, is suitable for reducing nitrogen oxides in the exhaust gas of lean-operated otto engines and diesel engines.

Because of the described dependence of the storage/release go action on the $\lambda$-value of the NOx-containing gas, the Ag-containing solid can ideally be used as the NOx storage component in an NOx storage catalyst. When it is used together with another solid with a catalytic activity for the removal of nitrogen (in the following called a catalyst component), the nitrogen can be removed from high-$O_2$ gases. In particular, the catalyst component may be one with a three-way function.

The NOx-storing solid according to the invention as the component of an NOx storage catalyst can contribute to meeting future emissions limit values. Its particular distinguishing characteristic is its resistance to sulfur.

Another very advantageous characteristic of the Ag-containing solid used according to the invention is the fact that it stores nitrogen oxides even at very low temperatures. By means of the Ag-containing material, an NOx storage is possible in the temperature range of below 200° C. The release of the stored NOx can subsequently take place at temperatures of above 200° C.

For use in vehicles, the powdery material (catalyst component and NOx storage component on a microporous carrier substance) is applied as a coating to a ceramic or metallic honeycomb body (in the following: geometrical carrier, for a delimitation with respect to the microporous carrier substance). For other applications, it can also be used in shapes differing from the above, for example, as pellets or extrudates.

In this case, NOx storage components and catalyst components can be combined as follows:

Atomic Mixture

NOx storage components and catalyst components are situated side-by-side on a microporous carrier substance, which, in turn, is applied to a geometric carrier.

Powder Mixture

NOx storage components and catalyst components are in each case situated individually on microporous carrier substances which are applied to a geometric carrier as a powder mixture.

Layer Arrangement

NOx storage components and catalyst components are each situated individually on microporous carrier substances which are arranged in layers and applied to a geometric carrier.

Structured Arrangement

NOx storage components and catalyst components are each situated individually on microporous carrier substances which are each mounted separately from one another on different geometric carriers, for example, in a serial arrangement.

NOx storage components as well as the catalyst components may be applied to the microporous carrier substance, for example, by means of the following conventional processes:

Impregnation, sol-gel process, wet-chemical precipitation, such as hydroxide precipitation;

ion exchange in a zeolite.

In particularly advantageous embodiments, the Ag-fraction relative to the total mass of Ag-containing solid plus microporous carrier substance amounts to at least 10 ma %.

EXAMPLES

Embodiment A

Ag-Containing NOx Storage Component on Microporous Carrier Substance (Ag—$Al_2O_3$)

Powder A: Ag-Containing Compound on a Microporous Carrier Substance

First, a 50 g quantity of $Al_2O_3$ (BET-surface: 210 m2/g) is dried for 12 hours at 125° C. For producing the $AgNO_3$-impregnation solution, 50 to 70 g $AgNO_3$ are dissolved in 38 ml water at 80° C. The dry $Al_2O_3$-powder is impregnated with the $AgNO_3$-solution and is subsequently dried for 12 hours at 1250°. Finally, the powder is calcined for 5 hours at 650° C. in an air current.

Coating of a Geometric Carrier (Ceramic Honeycomb Body)

For producing the coating solution, a hydrous suspension containing 50 g of the above powder A is ground in a planetary ball mill and is then diluted with water. In addition, water glass can be added as an adhesive agent for improving the adhesion of the powder on the honeycomb body. The solid concentration of the suspension amounts to approximately 100–300 g/l (depending on the adhesive agent content).

For coating, the ceramic carrier is immersed in the suspension, and the excess solution is then blown out of the channels by means of compressed air. Drying then takes place in the drying chamber. This process is repeated until the desired application mass has been reached. Finally, the coated carrier is calcined for 5 hours at 650° C. in an air current.

Embodiment B

Ag- and Precious-Metal-Containing NOx Storage Component on Microporous Carrier Substances (Ag—$Al_2O_3$//PT/Rh—$Al_2O_3$)

Powder A: Ag-Containing Compound on a Microporous Carrier Substance

Produced as in Embodiment A.

Powder B: Precious Metals on a Microporous Carrier Substance

A commercially available powder is used in which Pt (1 ma-%) and Rh (0.5 ma-%) are contained on $Al_2O_3$ as the microporous carrier substance.

Coating of a Geometric Carrier (Ceramic Honeycomb Body)

For producing the coating solution, a mixture of 37 g of powder A and 13 g of power B as a hydrous solution are ground in a planetary ball mill and diluted with water. Then the process is continued as described in Embodiment A, in which case, deviating from Embodiment A, the final temperature treatment of the coated carrier takes place at 500° C. for 5 hours in forming gas (5% by volume H2 in N2).

Embodiment C

NOx Storage Catalyst (NOx Storage Component Ag—$Al_2O_3$ and Three-Way Catalyst)

Powder A: Ag-Containing Compound on a Microporous Carrier Substance

Produced as in Embodiment A.

Powder B: Catalyst Component on a Microporous Carrier Substance

A commercially available three-way catalyst in powder form is used as the catalyst component.

Coating of Geometric Carriers (Ceramic Honeycomb Bodies)

Powder A and B are each applied as a coating to separate ceramic carriers. The coating takes place as described in Embodiment A, 50 g of powder respectively being used.

The final temperature treatment of the geometric carrier coated with powder A takes place as described in Embodiment A; that of the geometric carrier coated with powder B takes place at 500° C. for 5 hours in a forming gas flow (5% by volume H2 in N2).

Arrangement of the Geometric Carriers

The carriers coated with powder A (NOx storage material) and with powder B (three-way catalyst) are arranged in series. In this case, the carrier coated with powder A is disposed in front of the carrier coated with powder B.

Other objects, advantages and novel features of the present invention will become apparent from the following detailed description of the invention when considered in conjunction with the accompanying drawings.

DETAILED DESCRIPTION OF THE DRAWINGS

Figure 1:
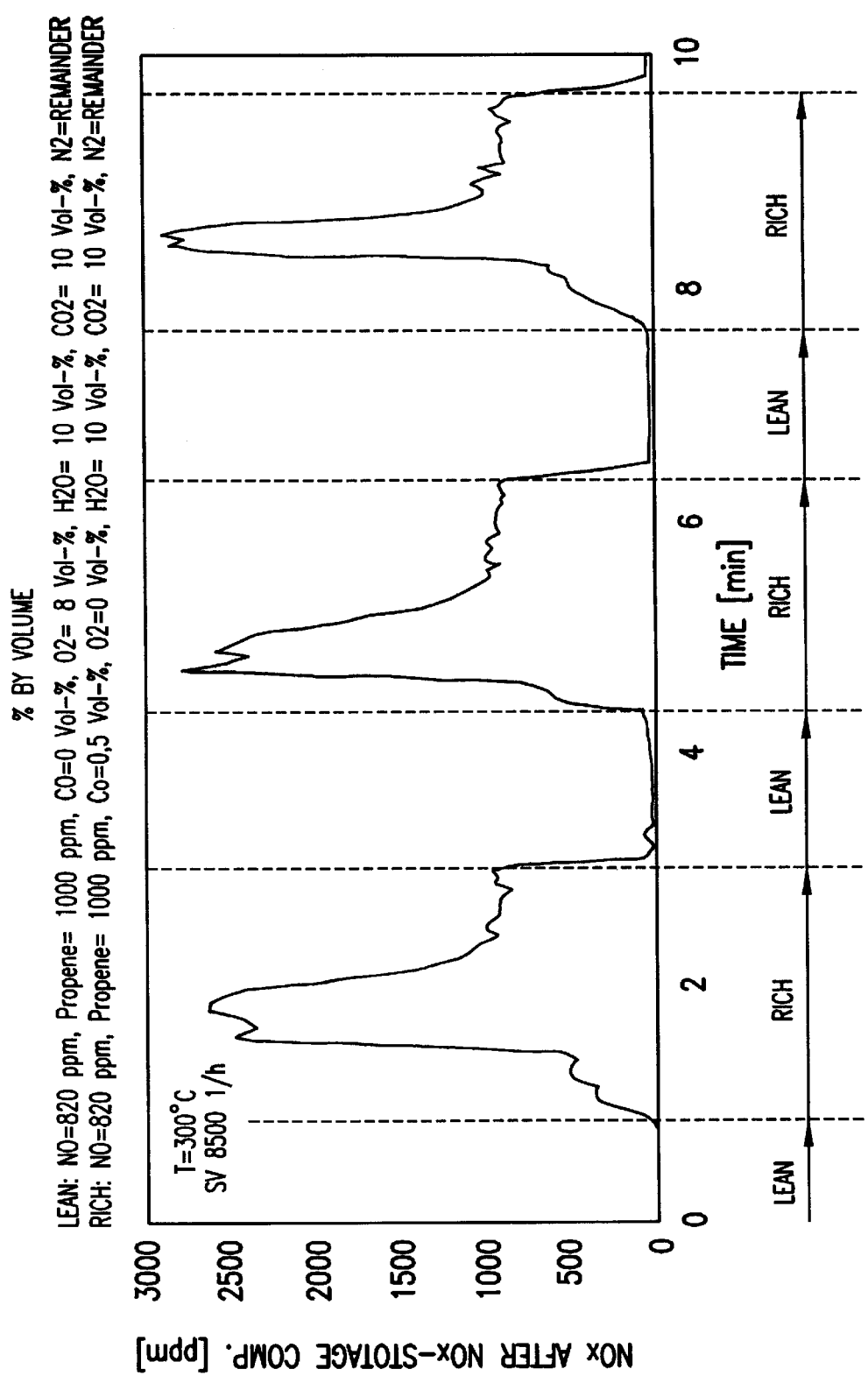
FIG. 1 is a view of the λ-controlled NOx storage and release action of Ag—$Al_2O_3$ at 350° C.—cyclical operation.

FIG. 1 (λ-Controlled NOx Storage and Release—Cyclical Operation)

The method of operation of an Nox-storing solid produced according to Embodiment A was examined. The Ag-content amounts to 39 ma %, relative of the total mass of Ag-containing compound plus microporous carrier substance. FIG. 1 illustrates the course of the NOx concentration (in ppm), which is measured in the event of the change of the λ-value of the gas atmosphere after the NOx storage material, as an example for a temperature of 350° C. In this case, the reaction gas had the following composition in the lean and rich operation:

|  | Lean (λ > 1) | Rich (λ < 1) |
| --- | --- | --- |
| NO | 820 ppm | 820 ppm |
| propene | 1,000 ppm | 1,000 ppm |
| CO | 0 | 0.5% by vol. |
| $H_2O$ | 10% by volume | 10% by vol. |
| $O_2$ | 8% by valume | 0% by volume |
| $CO_2$ | 10% by volume | 10% by volume |
| $N_2$ | remainder | remainder |
| space velocity | 8,500 1/h | 8,500 1/h |

At the point in time t=0, the test was started under lean (high-$O_2$) conditions. The storage of the nitrogen oxides in the solid takes place in this atmosphere. In the case of an NOx starting concentration of 820 ppm, after the NOx storage material, a concentration of zero is measured. After the subsequent change of the gas atmosphere to rich conditions (t=approx. 50 s), nitrogen oxides are released. As a result, the NOx-concentration after the NOx storage material rises for a short time to up to 2,600 ppm in comparison to 820 ppm before the NOx storage material. After the complete release of the nitrogen oxides, in the rich operation, the same NOx-concentration is observed after the NO-storage material as before the NOx storage material (=820 ppm). After the subsequent switching to the lean operation (t=approx. 3 min.), another storing of the nitrogen oxides will then take place. This λ-shifting operation was repeated in a manner which can be reproduced several times.

Figure 2:
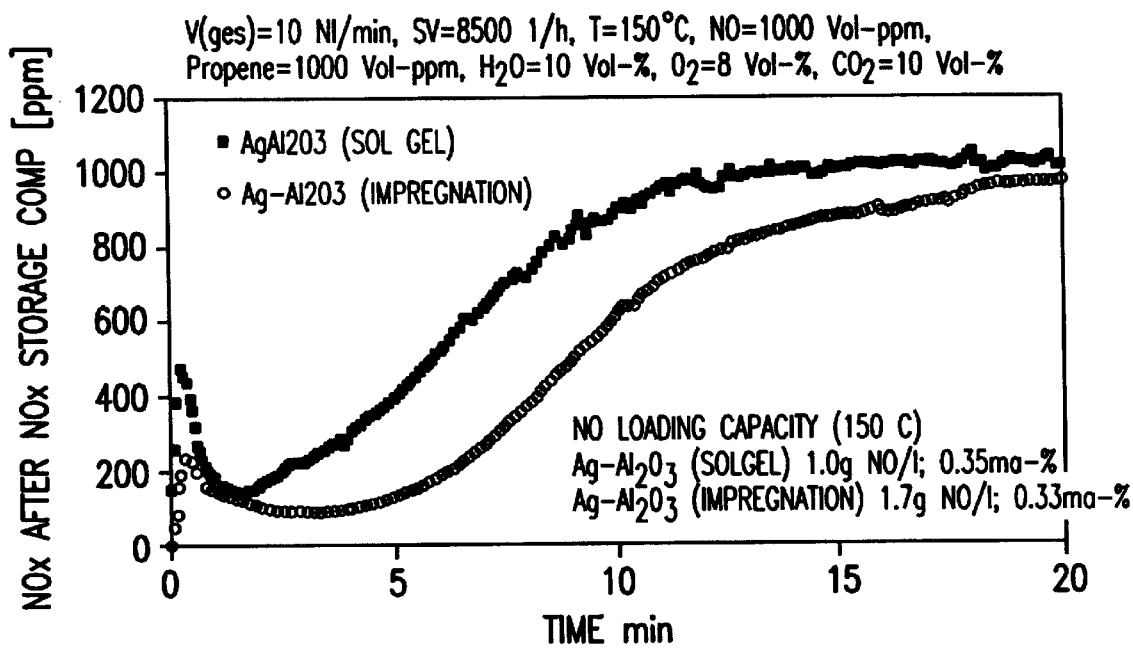
FIG. 2 is a view of the NOx storage action of AG—$Al_2O_3$ at 150° C., produced by means of an impregnation process (□) a sol-gel process (≡)

FIG. 2 (Low-Temperature NOx Storage)

FIG. 2 illustrates the release action of Ag—$Al_2O_3$ for NOx at 150° C. Here, the action of two NOx storage materials is shown which were produced by means of different preparation processes, specifically impregnation (□) according to Embodiment A and the sol-gel process (≡). In the case of the sol-gel production, the Ag-content is 25 ma %; in the case of the production by impregnation, it is 46 ma %.

The storage action of the two NOx storage materials is similar. After the start of the test, an NOx concentration which is considerably reduced with respect to the NOx starting concentration is first determined at the output of the NO-storage material. This is the result of the storage of the NOx on the Ag—$Al_2O_3$. As the operating time and therefore the loading of the NOx storage material increases, the NOx-concentration after the NOx storage material will rise until it finally reaches the input value, in the case of the sol-gel-prepared NOx storage material, after 12 minutes, and in the case of the impregnation-prepared NOx storage material, after 20 minutes. In this condition, the NOx storage material has reached its full Nox-loading capacity. In the illustrated example, a loading capacity of 1.0 g NOx per liter of honeycomb body volume is reached in the case of the sol-gel-prepared NOx storage material, and a loading capacity of 1.7 g NOx per liter of honeycomb body is reached in the case of the impregnation-prepared NOx storage material. The difference in the loading capacity between the two materials is the result of the different amounts of the NOx storage materials applied to the honeycomb body. In a comparison of the loading of the NOx relative to the mass of the NOx storage material, a loading of approximately 0.35 ma % is obtained in both cases.

Figure 3:
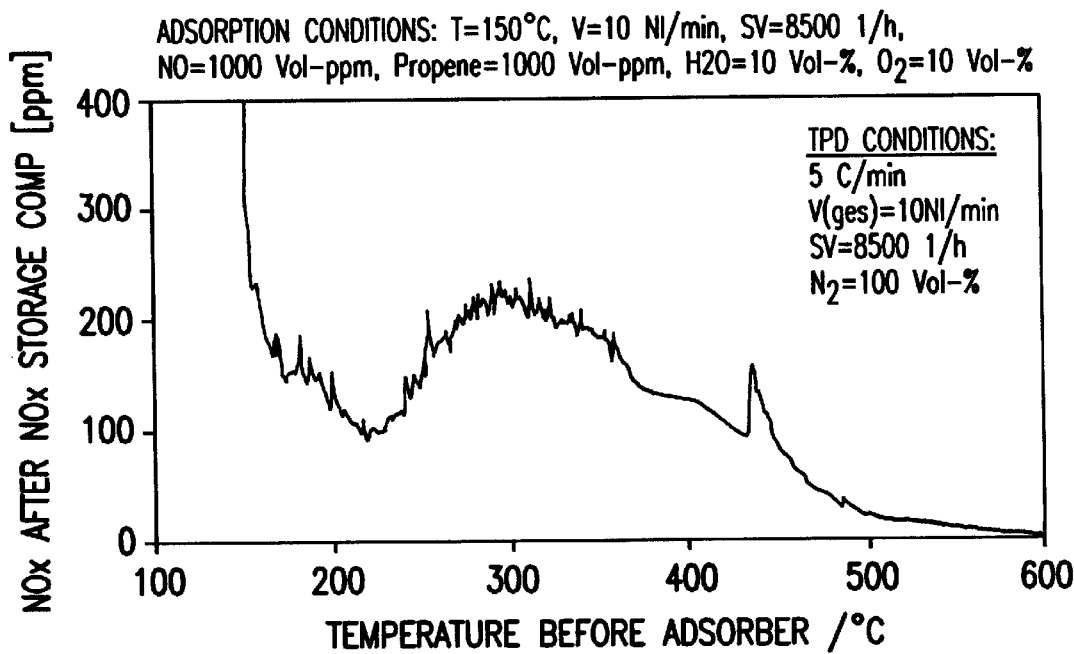
FIG. 3 is a view of the temperature-dependent NOx release action of Ag—$Al_2O_3$.

FIG. 3 (NOx Release)

The NOx release action of the NOx storage material produced according to Embodiment A is illustrated in FIG. 3. The Ag-content amounts to 46 ma %. In the illustrated case, the loaded Ag—$Al_2O_3$-material was heated after the NOx storage at 150° with a temperature ramp of 5° C./min in nitrogen and the NOx-concentration after the NOx storage material was analytically monitored online. It is shown that the release of the predominant portion of the released nitrogen oxides takes place in the temperature range of between 230° C. and 450° C. (before the NOx storage material).

Figure 4:
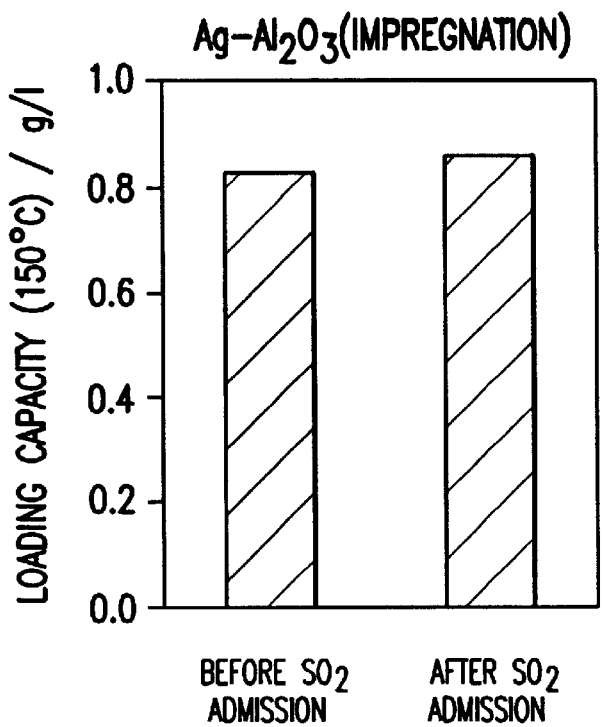
FIG. 4 is a view of the influence of $SO_2$ on the NOx-load capacity of Ag—$Al_2O_3$.

FIG. 4 ($SO_2$-Resistance)

The resistance of the Ag—$Al_2O_3$-storage material produced according to Embodiment A to $SO_2$ is illustrated in FIG. 4. The Ag-content amounts to 46 ma %. After an admission of 50 vol.-ppm $SO_2$ to the material for 2 hours at 450° C. with 10% by volume $O_2$, 10% by volume $H_2O$ in $N_2$, the NOx- storage capacity with respect to the new condition is maintained.

Figure 5:
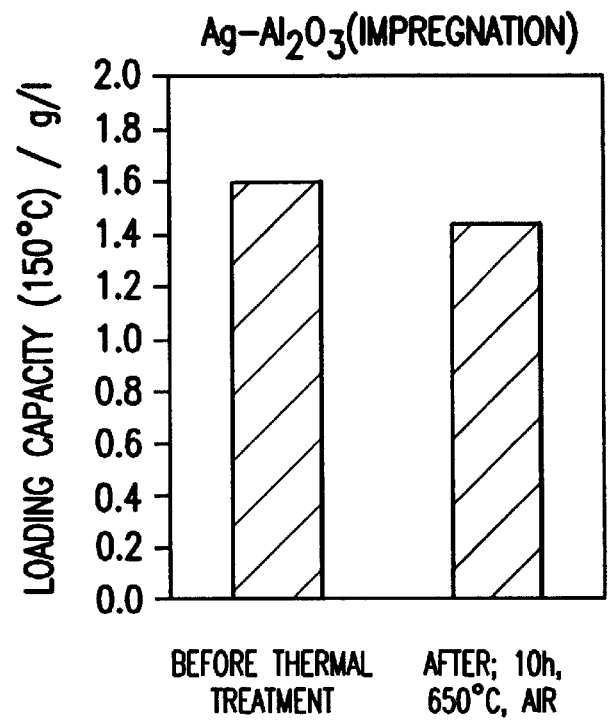
FIG. 5 is a view of the influence of high temperatures on the NOx-load capacity of Ag—$Al_2O_3$.

FIG. 5 (Thermal Resistance)

The thermal resistance of the NOx storage material (produced according to Embodiment A) is illustrated in FIG. 5. The Ag-content amounts to 46 ma %. After 10 hours at 650° C. in air, only a small decrease of the loading capacity of less than 10% was determined in comparison to new condition.

Figure 6:
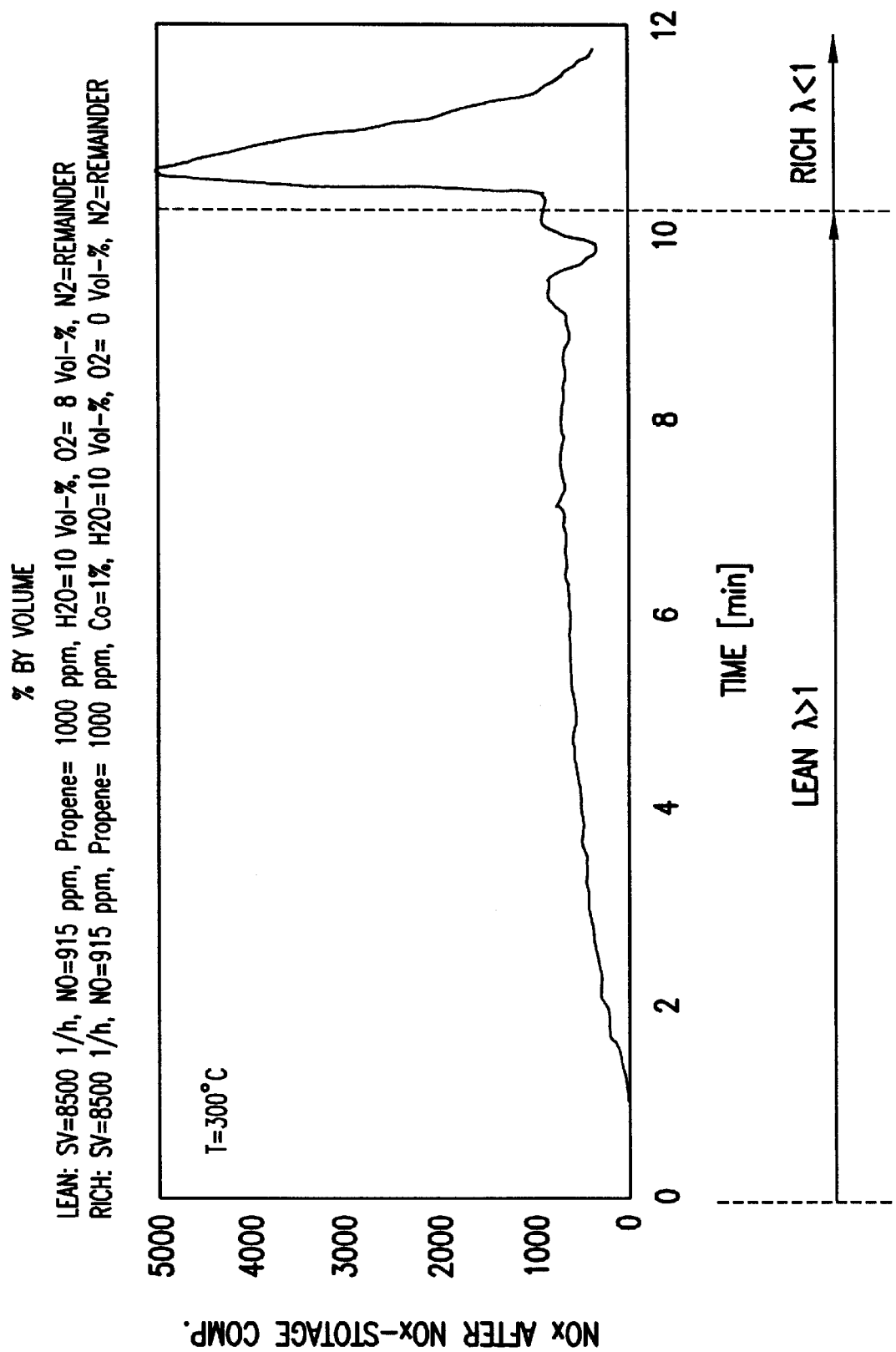
FIG. 6 is a view of the λ-controlled Nox- storage and release action of Ag—$Al_2O_3$/Pt/Rh-$Al_2O_3$ (powder mixture) at 300° C.—complete loading.

FIG. 6 (λ-Controlled NOx Storage and Release)

The method of operation of an NOx-storing solid produced according to Embodiment B was examined. The Ag-content amounts to 46 ma % FIG. 6 illustrates the course of the NOx concentration (in ppm), which is measured in the event of the change of the λ-value of the gas atmosphere after the NOx storage material, as an example for a temperature of 300° C. In this case, the reaction gas had the following composition in the lean and rich operation:

|  | Lean (λ > 1) | Rich (λ < 1) |
| --- | --- | --- |
| NO | 915 ppm | 915 ppm |
| propene | 1,000 ppm | 1,000 ppm |
| CO | 0 | 1% by vol. |
| $H_2O$ | 10% by volume | 10% by vol. |
| $O_2$ | 8% by volume | 0% by volume |
| $N_2$ | remainder | remainder |
| space velocity | 8,500 1/h | 8,500 1/h |

At the point in time t=0, the test was started under lean (high-$O_2$) conditions. The storage of the nitrogen oxides in the solid takes place in this atmosphere. In the case of an NOx starting concentration of 915 ppm, downstream of the NOx storage material, an NOx-concentration of zero is measured during the first minute. Then a slow rise of the NOx-concentration takes place which signalizes the increasing loading of the NOx storage material. After an operating time of approximately 10 minutes, the NOx-concentration downstream of the NOx storage material corresponds to that upstream of the NOx storage material. In this condition, the NOx storage material is fully loaded. After the subsequent change of the gas atmosphere to rich conditions, the abrupt release of the nitrogen oxides takes place. In this case, the quantity of nitrogen oxides stored in the lean operation, which amounts to approximately 0.8 g NOx per liter of honeycomb body volume, corresponds approximately to the quantity set free under rich conditions.

Figure 7:
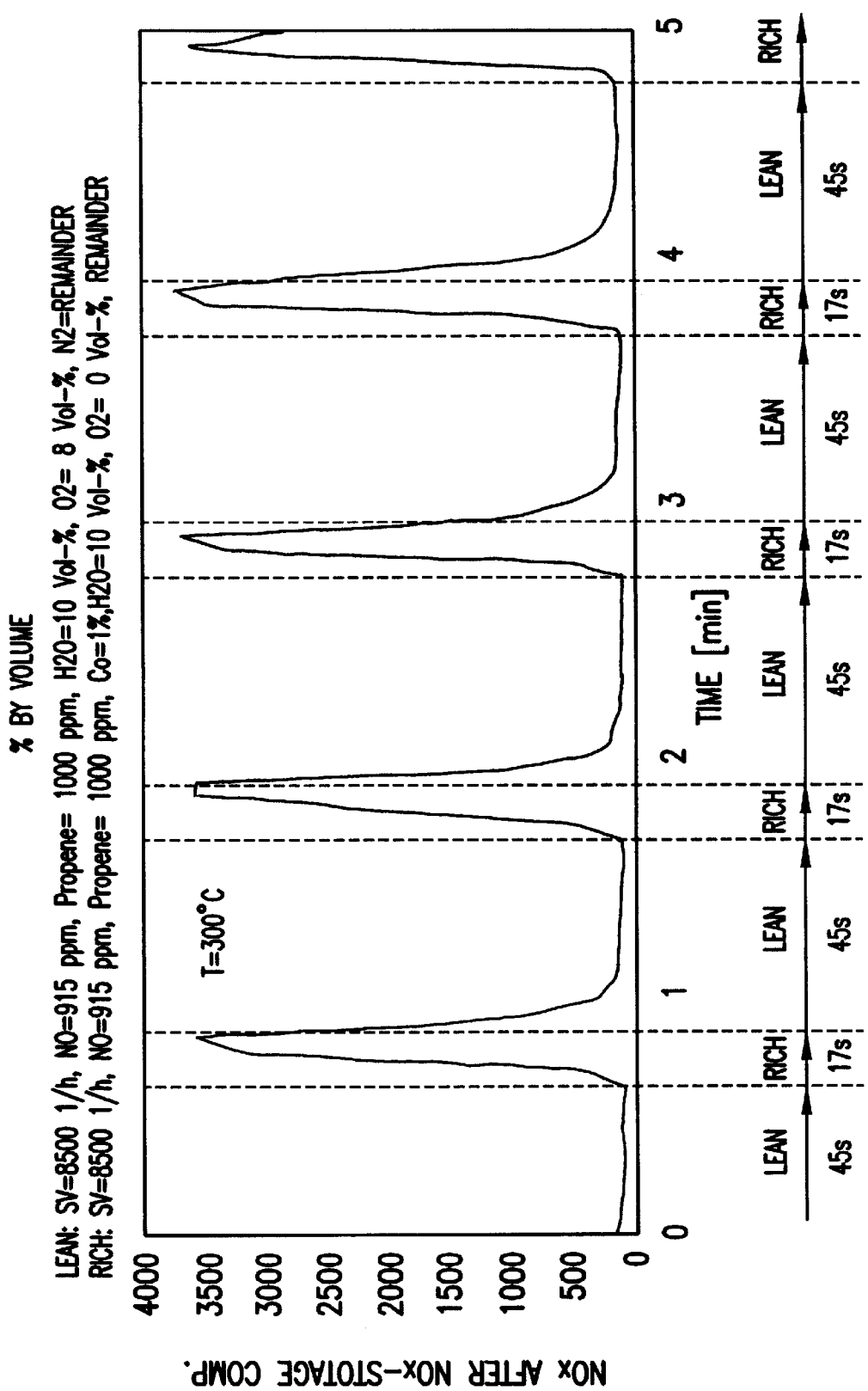
FIG. 7 is a view of the λ-controlled NOx- storage and release action of Ag—$Al_2O_3$/Pt/Rh-$Al_2O_3$ (powder mixture) at 300° C.—cyclical operation.

FIG. 7 (λ-Controlled NOx Storage and Release—Cyclical Operation)

In another measurement, the NOx storage material according to Embodiment B was alternatingly operated in a lean and in a rich atmosphere. The Ag-content amounts to 39 ma %. The composition of the lean and the rich atmosphere is the same as in FIG. 6. In this case, the duration of the lean phase in which the NOx storage takes place, is limited to 45 s in order to avoid an NOx-breakthrough. The duration of the rich phase was 17 s. Under the experimentally existing conditions, this approximate time was required for the complete release of the nitrogen oxides. The course of the NOx-concentration (in ppm) after the NOx storage material under cyclical conditions is illustrated in FIG. 7. The storage of the nitrogen oxides in the lean operation (NOx-concentration>20 oppm) and the corresponding release in the rich operation are shown. This change of the gas atmosphere was repeated for several cycles and a reproducible storage and release action were determined. The quantity of nitrogen oxides stored in the lean operation corresponds approximately to the quantity released under rich conditions.

The storage and release action of the solid was also examined in each case at 350° C. and 400° C. The same action was determined in this case as the action described for a temperature of 300° C.

Figure 8:
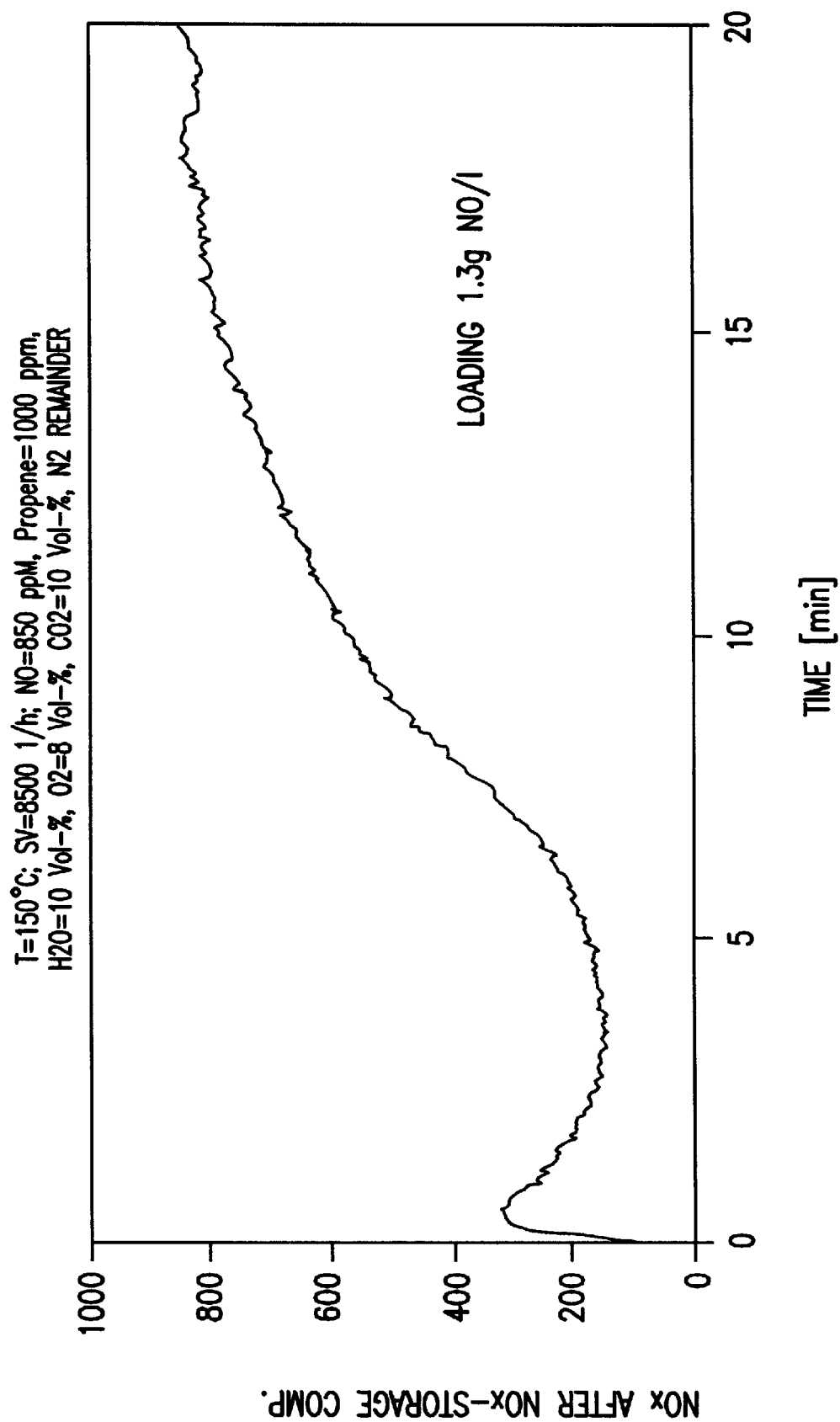
FIG. 8 is a view of the NO x storage action of Ag—$Al_2O_3$/Pt/Rh-$Al_2O_3$ (powder mixture) at 150° C.

FIG. 8 (Low-Temperature NOx Storage)

In FIG. 8, the low-temperature storage of the solid produced according to Embodiment B is illustrated for a temperature of 150° C. The Ag-content amounts to 39 ma %. The composition of the reaction gas is indicated at the upper margin of the diagram. After the start of the test, an NOx-concentration which is considerably reduced with respect to the initial NOx-concentration is first determined at the output of the NOx storage material. This is the result of the storage of the nitrogen oxides in the solid. With an increasing operating time and a corresponding increasing loading of the NOx storage material, the NOx-concentration downstream of the NOx storage material rises until it finally has reached its initial value after 20 minutes. In this condition, the NOx storage material has reached its full NOx-loading capacity. In the illustrated embodiment, a loading capacity of 1.3 g NOx per liter of honeycomb body is reached.

Figure 9:
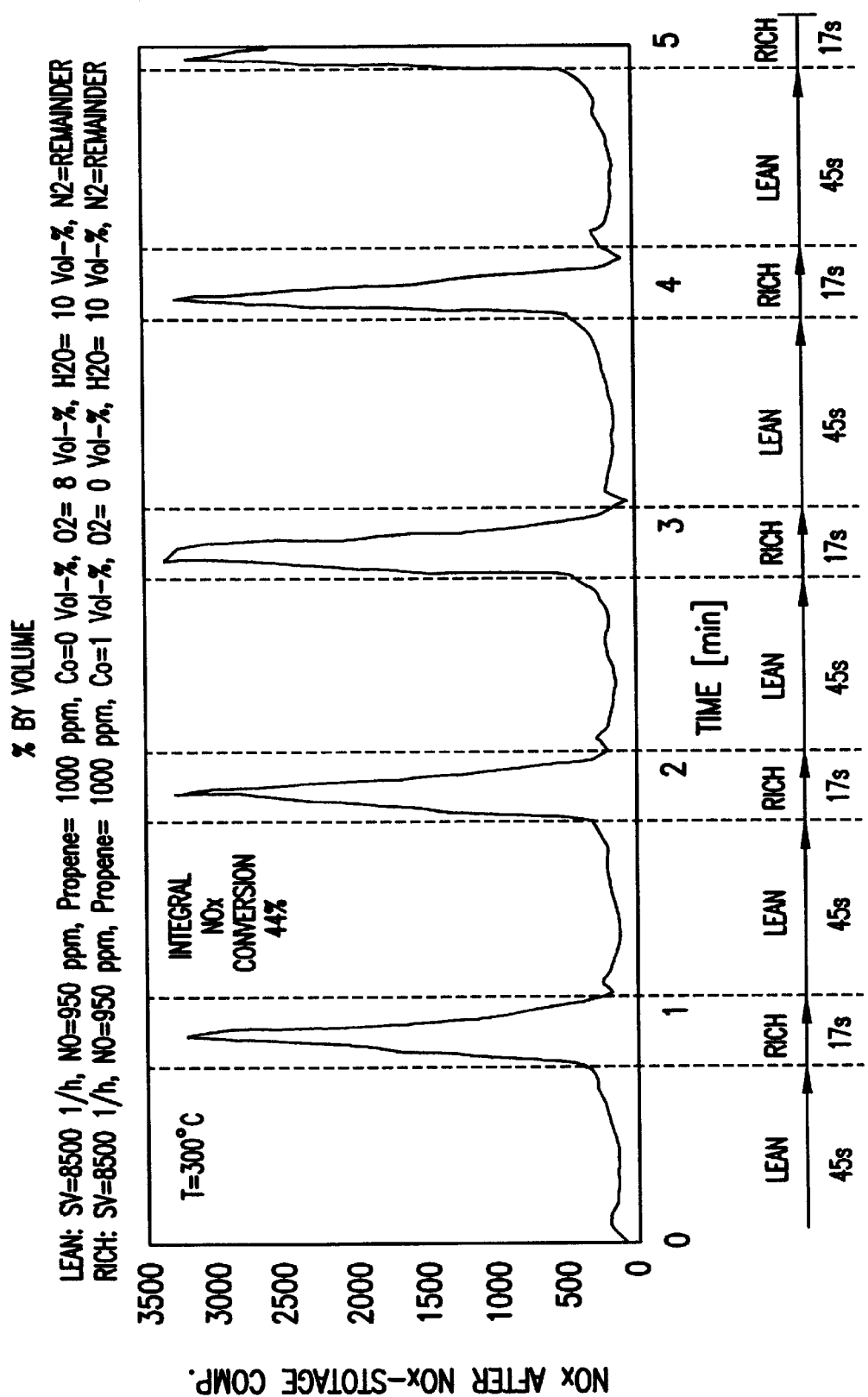
FIG. 9 is a view of the λ-controlled NOx- storage, release and NOx conversion action of Ag—$Al_2O_3$ and the three-way catalyst (serial arrangement) at 300° C.—cyclical operation.

FIG. 9 (λ-Controlled NOx Storage, Release and Conversion)

The method of operation of the NOx storage catalyst according to Embodiment C is illustrated in FIG. 9. The Ag-content of the NOx storage component Ag—$Al_2O_3$ relative to its total mass (Ag-containing compound plus microporous carrier substance) amounts to 39 ma %. The serially arranged components, NOx storage component and three-way catalyst, were operated in an alternating λ of the gas atmosphere. In this case, the duration of the lean phase, in which the NOx storage takes place, was 45 s; that of the rich phase, in which the NOx release and conversion takes place, was 17 s. In the lean phase, the NOx storage can be recognized by the NOx-output concentration which is lower than the initial value (950 ppm). The release and the partial conversion of the nitrogen oxides takes place in the rich phase. If the integral NOx-conversion is determined for the whole duration of the test as the difference of the whole fed NOx-quantity with respect to the whole NOx quantity emerging after the catalyst relative to the whole fed NOx-quantity, a value of 44% is obtained. If, in comparison, the three-way catalyst alone were to be operated under identical operating conditions, no NOx-conversion should be expected in the lean phase; in contrast, a NOx-conversion of almost 100% should be expected in the rich phase. In the case of the set cycle ratio of the lean phase to the rich phase (45 s to 17s), an integral NOx-conversion of approximately 27% would be expected. As the result of the described serial arrangement of the NOx storage material according to the invention and the three-way catalyst, an additional NOx-conversion of 17% can therefore be achieved in comparison to the conventional three-way catalyst.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of treating a gas comprising nitrogen oxides, comprising:

controlling cycling of the λ-value of the gas to alternate in a predetermined manner between a λ-value that is greater than 1 and a λ-value that is less than or equal to 1;

storing nitrogen oxides in a solid when the λ-value of the gas is greater than 1; and releasing said stored nitrogen oxides when the λ-value of the gas is less than or equal to 1, wherein the λ-value is a ratio of oxidizing constituents to reducing constituents contained in said gas, wherein the solid consists of a material selected from the group consisting of $Ag_2O$, $Ag_2CO_3$ and AgOH; at least one other precious metal; and a microporous carrier substance.

2. A method according to claim 1, wherein the other precious metal is selected from the group consisting of Pt, Pd, Rh, Ir, Au, Ru, and Os.

3. A method according to claim 1, wherein the solid and the precious metal material are applied to a microporous carrier substance.

4. A method according to claim 3, wherein the microporous carrier substance is at least one material selected from the group consisting of $Al_2O_3$, $CeO_2$, La-containing $CeO_2$, $ZrO_2$, La-containing $ZrO_2$, $SiO_2$, $TiO_2$, Mg—Al mixed oxide, Si—Al mixed oxide, and zeolites.

5. A method according to claim 1, wherein said storing occurs at a temperature below 200° C., and said releasing occurs at a temperature of above 200° C.

6. A method according to claim 1, wherein the gas is the exhaust gas of a diesel engine or of a lean-operated otto engine.

7. A method according to claim 1, wherein the λ-value of greater than 1 corresponds to lean operation of an engine and the λ-value of less than 1 corresponds to rich operation of the engine.

* * * * *